April 21, 1925.

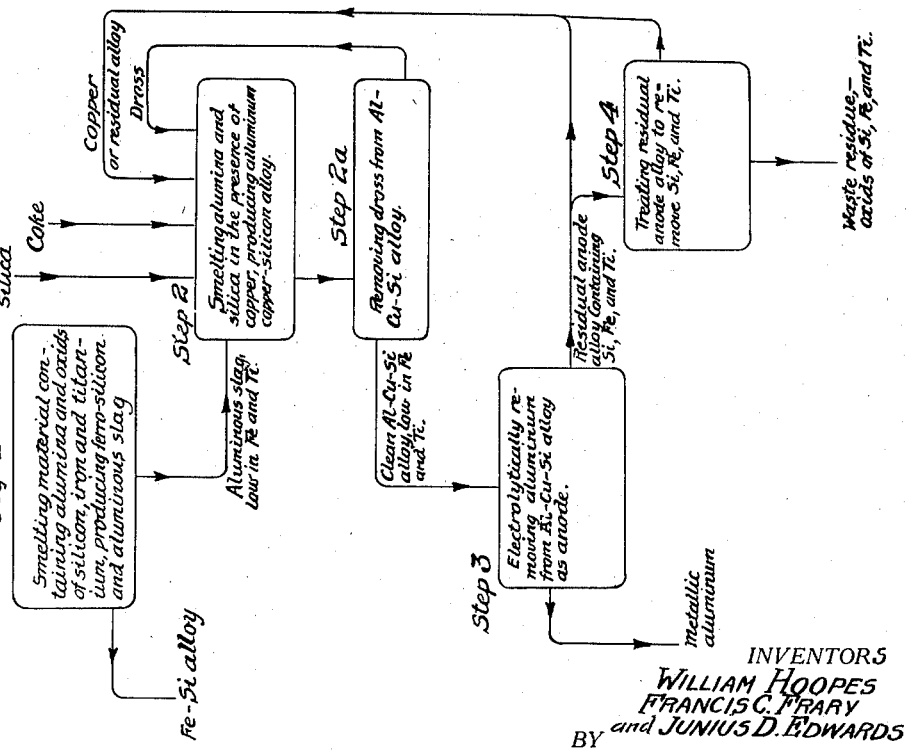

W. HOOPES ET AL

PRODUCTION OF METALLIC ALUMINUM FROM IMPURE MATERIALS

Filed Dec. 21, 1922   2 Sheets-Sheet 2

Inventors
WILLIAM HOOPES
FRANCIS C. FRARY
and JUNIUS D. EDWARDS
By their Attorneys
Cooper, Kerr & Dunham Patented Apr. 21, 1925.

1,534,316

UNITED STATES PATENT OFFICE.

WILLIAM HOOPES, OF PITTSBURGH, AND FRANCIS C. FRARY AND JUNIUS D. EDWARDS, OF OAKMONT, PENNSYLVANIA, ASSIGNORS TO ALUMINUM COMPANY OF AMERICA, OF PITTSBURGH, PENNSYLVANIA, A CORPORATION OF PENNSYLVANIA.

PRODUCTION OF METALLIC ALUMINUM FROM IMPURE MATERIALS.

Application filed December 21, 1922. Serial No. 608,283.

*To all whom it may concern:*

Be it known that we, WILLIAM HOOPES, FRANCIS C. FRARY, and JUNIUS D. EDWARDS, all citizens of the United States of America, the said WILLIAM HOOPES residing at Pittsburgh and the said FRANCIS C. FRARY and JUNIUS D. EDWARDS residing at Oakmont, all in the county of Allegheny and State of Pennsylvania, have invented certain new and useful Improvements in Production of Metallic Aluminum from Impure Materials, of which the following is a full, clear, and exact description.

This invention relates to the production of metallic aluminum of practically any high degree of purity, from all naturally occurring materials containing substantial amounts of alumina, as for example, bauxite, feldspar, common clay, alunite, wavellite, etc. The chief object of the invention is to provide for the purpose mentioned a process which is commercially practicable in respect to the cost of the aluminum produced. Another object is to provide a process in which pure alumina, pure carbon anodes, or other pure materials or products are not, in general, required in any stage or step. All naturally occurring aluminous materials contain impurities in substantial amounts, as for example iron, titanium, and silicon, and must be carefully purified by costly chemical means to fit them for use in prior methods of producing aluminum; and accordingly another object of the present invention is to provide a process by which pure aluminum can be obtained without preliminary chemical treatment to remove impurities such as those referred to. Still another important object is to provide a process of producing aluminum, in which raw materials once heated need not be allowed to cool, with the attendant loss of heat, until they are converted into the finished product of the process, and in which the cost of transporting and storing large amounts of costly intermediate products or materials, such as the pure alumina required for prior processes, is eliminated.

In carrying out the invention in the preferred manner the aluminous material may be treated to remove more or less of any iron and titanium contained in it and to produce from the material a commercially usable iron-silicon alloy and a highly aluminous residue or slag containing the greater part of the alumina. This residue or slag may, and preferably does, contain some silica, and it is not necessarily entirely free of iron or titanium. On the contrary it usually contains small amounts of one or both of these elements, but their presence is allowable up to several per cent.

The slag described above is now treated with carbonaceous or other suitable reducing agent, in the presence of copper and at an elevated temperature, to reduce alumina and silica and cause the resulting impure aluminum and silicon to be absorbed by the copper, thus giving an impure aluminum-copper alloy containing silicon. Here again the presence of small amounts of iron and titanium in the product is permissible.

Where it is desired to produce an aluminum-copper-silicon alloy containing more than a small percentage of silicon, it may, in some cases, be better to add the extra silicon later. This may be done advantageously by producing, in a separate furnace, an alloy containing copper and silicon, rich in the latter ingredient, and blending a sufficient amount of this alloy with the alloy of lower silicon content produced as outlined above. In most instances it is desirable to have the silicon-rich alloy contain aluminum. Where material is available which is already sufficiently low in iron and titanium, as in the case of certain white bauxites or the residue from the calcination of alunite, it may not be necessary to subject the material to treatment designed particularly for the removal of iron and titanium; in which case the aluminum-copper-silicon alloy can be produced by direct reduction of the material, with or without the addition of silicon in suitable form, as above described. On the other hand, in the case of materials of sufficiently low iron content but containing too much titanium, as for example certain white bauxites, a suitable aluminum-copper-silicon alloy can be produced therefrom directly, as by electrothermal reduction in the presence of copper, and thereafter removing titanium by allowing it to separate out in the form of dross which is removed by skimming. In this method of removing titanium the alloy should be removed from the furnace at a temperature high enough to insure that the titanium is carried with it. The alloy is then cooled down to a suitable temperature, say somewhat below about 1000° C. but substantially above the freezing point of the main body of the alloy. During this cooling most of the titanium, or a substantial amount of it, separates out in the form of dross, as already stated. Notwithstanding this treatment the alloy may still contain an undersirable amount of impurities, probably non-metallic in character. If this is found to be the case, such impurities as are mechanically entrapped or suspended in the alloy can be decreased to the desired extent by further treatment, for example as described hereinafter.

The silicon-bearing aluminum-copper alloy described, which may contain iron and titanium, is now subjected to electrolysis with a molten electrolyte composed, preferably, of fluorids of aluminum, sodium and barium; or more generally, an electrolyte containing aluminum and sodium fluorids with the addition of one or more fluorids of the alkali earth metals of atomic weight greater than 80. In this step the composition of the bath or electrolyte is adjusted to give the molten bath a density between the densities of the aluminum-copper-silicon alloy and the pure aluminum removed therefrom, so that the alloy, which constitutes the anode, will remain in the bottom of the cell, the electrolyte will float on the alloy, and the pure aluminum, which forms the cathode, will float on the electrolyte, throughout a wide range of working temperatures. This step removes aluminum from the anode alloy and deposits it on the cathode aluminum, leaving behind, in the alloy, practically all the copper, silicon, iron and other impurities, except to the extent that one or more of these substances, as for example silicon, may be desired in, or is unobjectionable in, the cathode aluminum.

When the aluminum (or the desired portion of it) has been removed from the anode alloy the latter, thus impoverished of aluminum, is withdrawn from the electrolytic cell and may be treated to remove more or less silicon, iron and titanium, being subsequently returned to the second step of the process for re-use in making the needed aluminum-copper alloy. The treatment of the residual improverished alloy to diminish its impurity content may consist in a simple oxidation and slagging in the well known way.

By the process outlined above it has been possible to produce on a commercial scale, from common bauxite, or even from clay, aluminum having a purity of over 99.8 per cent; and that, too, at a cost materially lower than the cost of producing aluminum by the Hall process, which at best, using materials carefully purified in advance, gives a product of less purity.

Referring to the accompanying drawings,

Fig. 1 is a diagram showing in the manner of a flow sheet an outline of the process as preferably performed;

Fig. 2 is a longitudinal section, somewhat diagrammatic in character, illustrating a simple electric furnace suitable for carrying out the first and second steps, respectively;

Figure 3:
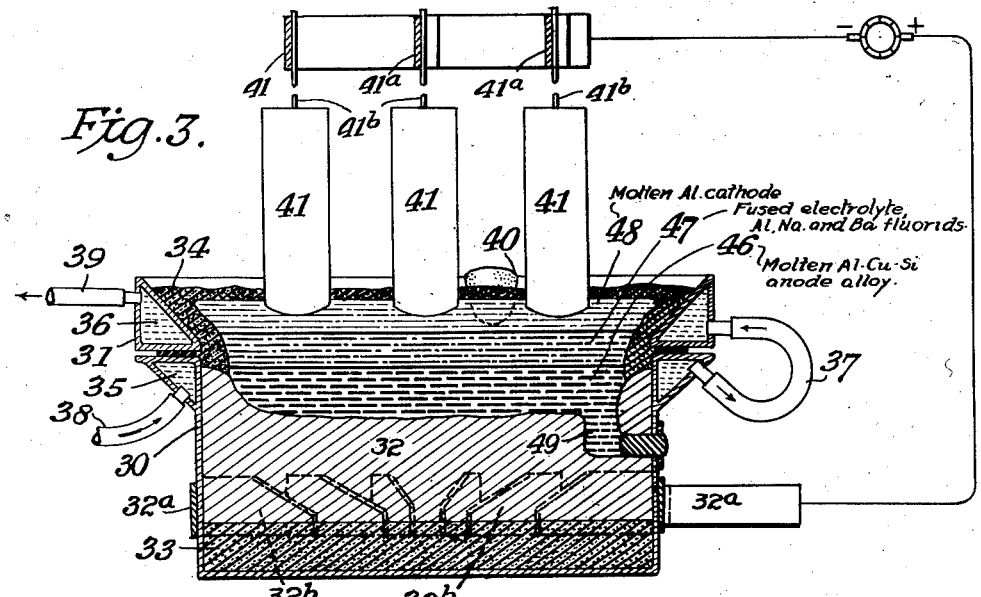
Fig. 3 is a sectional view illustrating, in a diagrammatic manner, a cell suitable for the electrolytic separation of aluminum from the alloy or crude aluminum produced by the preceding steps.

As will be seen from Fig. 1, the first step of the process (as performed in the preferred manner) comprises smelting material containing alumina and silica, and iron and titanium oxids, to produce ferro-silicon and a highly aluminous slag containing alumina and silica, but with limited amounts of iron and titanium. The ferro-silicon and the slag may be withdrawn separately, the former for use in steel making or for other purposes and the latter for treatment in the second step, where it is smelted in step 2 (with or without additional silica) in the presence of copper to produce aluminum-copper-silicon alloy of low iron and titanium content. Any unreduced slag or dross produced in this step may be returned to the furnace, while the aluminum-copper-silicon alloy is withdrawn and (after preparatory purifying if necessary or desirable, as step 2ª, for example) is subjected to electrolytic treatment in step 3, where the aluminum is removed. The residual alloy, containing the copper, and such amount of the other ingredients as has not been allowed to be deposited with the aluminum, is withdrawn and may be treated in step 4 to remove enough of these other ingredients to leave the copper fit for re-use in step 2. Thus the copper can be used repeatedly, circulating through steps 2, 3 and 4 as a vehicle for the aluminum. In cases where the impurity content of the residual alloy is not too high the alloy can go back to step 2 directly, without preliminary purification. The process thus outlined will now be described in detail, with the understanding, however, that many of the details, though advantageous and in some cases important, are not in all cases essential.

The steps in which removal of iron and titanium from the original aluminous material and production of aluminum-copper-silicon alloy are effected may be carried on successively or simultaneously in separate electric furnaces. For these steps, furnaces of the type illustrated in Fig. 2 are suitable and advantageous. In the figure referred to, 10 designates an open-topped steel shell of upright cylindrical form, containing a carbon bottom 11 and a refractory side lining 12 composed of fire-brick, bauxite-brick or other suitable material. The carbon bottom slopes toward a tap hole 13 for withdrawing ferro-silicon or aluminum-copper-silicon alloy, as the case may be. A tap hole 14 at a higher level permits withdrawal of slag independently of the underlying alloy. All these openings may be closed in any convenient manner. For example, a plug of pine wood may be driven into the hole, as indicated at 15. The heat encountered causes the plug to burst into flame immediately and it is converted into charcoal in a few minutes, but it lasts long enough to stop the flow of metal or slag and permit solidification back of the plug. The spout 16, preferably rather steep so as to prevent clogging by freezing due to rapid cooling of the slag or metal, may be lined with a mixture of magnesite and fire clay moistened with a solution of water-glass.

Conducting members are embedded in the carbon bottom or lower electrode 11 for connection with one terminal of a source of alternating current represented by the transformer 17. Preferably the conducting members are in the form of steel pipes, as indicated at 18, through which water may be passed for cooling purposes. The upper electrode is a carbon cylinder 19, connected to the other terminal of the secondary of the transformer 17. Any suitable means, not shown, may be provided to raise and lower the electrode and hold it in position. The energy input can be regulated in any convenient way, for example by varying the number of ampere turns in the transformer, preferably in the primary thereof, as indicated by the adjustable primary terminal 20.

The furnace may be cooled, if necessary or desirable, by water discharged upon the outer shell from an encircling pipe 21, arranged at the upper part of the shell and connected to a source of supply, not shown. The water running down the shell can be caught by a trough 22 and carried away by a drain pipe 23. To keep water out of the tap holes the latter may be provided with suitable shields, as 24.

When it is used for producing ferro-silicon and the aluminous slag, the furnace builds up a lining, as indicated at 25, for example, composed, especially in the lower part of the furnace, of charge and solidified slag.

An electrolytic cell suitable for removing aluminum from the aluminum-copper-silicon alloy produced in the second step of the process is shown in Fig. 3. In this figure, an open-topped steel shell is illustrated, composed of electrically insulated sections 30, 31. The lower section has a carbon bottom 32, forming the lower or positive electrode and resting on a layer 33 of suitable refractory heat-insulating material. The carbon bottom is formed with a cavity or bowl-like receptacle in its top as indicated. Extending upwardly from the sides of the depression, and over the joint between the two shell sections, is a side lining 34, composed of refractory material having good thermal and electrical insulating properties. The lining mentioned may be formed by the method described in the copending application of William Hoopes, Junius D. Edwards, and Basil T. Horsfield, Serial No. 608,289, filed December 21, 1922. According to the preferred manner of carrying out the method referred to, the lining is formed by freezing a crust on the sides of the shell, from a molten mixture containing aluminum, sodium and barium fluorides, and alumina sufficient in amount to saturate the mixture, so that the alumina freezes out, in the crust, in fine crystalline corundum-like form. A lining crust of this type has a relatively high melting point and hence will remain solid in the operation of the cell unless the temperature therein becomes abnormally high. To aid in keeping the crust solid and maintain the desired electrical insulating properties the cell is provided with external water jackets 35, 36, connected by a rubber pipe 37. Cooling water is supplied to the lower jacket through a rubber pipe 38 and is carried from the upper jacket by a rubber pipe 39. In the edge of the upper shell section is a tapping notch 40, for withdrawal of the refined aluminum. This notch or opening is normally closed by means of any suitable refractory material, as for example bath material, which will not contaminate the metal with which it comes in contact. Three upper electrodes, 41, are shown, but it will be understood that the precise number is immaterial. They are connected to the negative pole of a source of unidirectional current, represented conventionally at 42, by means of horizontal transverse busbars $41^a$ to which the copper rods $41^b$, attached to the electrodes, are secured in any convenient manner, preferably so as to permit the electrodes to be raised and lowered individually. The carbon bottom 32 is connected to the lower busbar $32^a$, encircling the cell, by a series of embedded distributor plates of steel, spaced equidistantly around the interior and welded to the shell, to which the busbar $32^a$ is suitably connected. This busbar is connected to the positive terminal of the source 42. The upper electrodes are preferably composed of graphite, as described and claimed in the copending application of Francis C. Frary, Serial No. 672,867, filed November 5, 1923.

Our present invention is carried out preferably in the following manner.

As an example it is assumed that clay is to be utilized as a source of aluminum, for example clay of about the following composition:

| | Per cent. |
|---|---|
| Alumina ($Al_2O_3$) | 38 |
| Silica ($SiO_2$) | 55 |
| Iron oxid ($Fe_2O_3$) | 5 |
| Titanium oxid (titanic acid, $TiO_2$) | 2 |

With the clay, preferably first calcined to eliminate moisture, iron is used in such amount that the total iron content of the charge (including the iron of the clay) will be sufficient to take up all of the reduced silicon and titanium, with the production of ferro-silicon containing, preferably, about 25 per cent of silicon. A reducing agent is needed, and for this purpose carbon, which may be in the form of coke, is employed. The amount of reducing agent should be sufficient to reduce all of the titanic acid and most of the silica; and inasmuch as the carbon of the upper electrodes takes part in the reaction, rather less carbon is supplied with the charge than would otherwise be needed. It may also be desirable to have some of the carbon in the form of charcoal, for the purpose of increasing the specific resistance of the charge. The iron component may be metallic but is preferably in the form of an ore, say $Fe_2O_3$. For the purpose of making the aluminous residue or slag more fluid there may be added a little fluxing material, for example feldspar, soda ash, common salt, or, preferably magnesia, as explained in the copending application of Frank D. Shumaker, deceased, Serial No. 623,370, filed March 7, 1923. The quantitative composition of the charge or mixture is discussed hereinafter.

In starting the process in the preferred manner the bottom of the furnace is covered with a layer of crushed coke, the electrode is lowered into contact with the coke, and the current is turned on. The electrode is then raised slightly, resulting in the formation of arcs and causing heating of the furnace interior. The charge is then delivered to the furnace. When the temperature has increased sufficiently the reaction begins, reducing the iron, silicon, and titanium oxids, and producing a mixture of the corresponding elements, which mixture as ferro-silicon-titanium alloy sinks to the bottom, whence it is withdrawn from time to time through the tap hole 13. In the drawing the molten alloy is indicated by the layer 26.

The quantitative composition of the charge mixture depends in large measure upon the alloy and slag which are to be produced. Suppose, for example, that with a clay of about the analysis above given, ferro-silicon of about the following analysis is desired: iron, 72 per cent; silicon, 25 per cent; aluminum, 2 per cent; titanium, 1 per cent. In such case the materials may be used in the proportions, approximately, of clay, 100 parts; carbon, 40 parts; iron, including the iron of the oxid in the clay, 70 parts; magnesia, including that present in the clay, 3 parts. The components are crushed to pass through a one or one and a half inch screen, and after they have been thoroughly commingled the mixture is charged into the furnace as required.

Of the components of the charge, the iron and silicon oxids can be reduced more easily than titanium oxid, and the latter more easily than alumina and magnesia; and accordingly there remain unreduced a small portion of the silica, the major portion of the alumina, and all or substantially all of the magnesia. These unreduced materials float in the form of slag on the ferro-silicon-titanium alloy.

The ferro-silicon titanium alloy, which may or may not contain a small amount of aluminum, can be used in steel manufacture, its quality making it highly desirable for that purpose. The porportions of the three metals named can be varied in a number of ways, as for example by changing the proportion of iron in the charge, or by substituting more or less of the alloy itself for a portion of the iron in the charge so that the alloy is enriched in silicon and titanium by passing through the reaction zone of the furnace a second or third time.

The composition of the aluminous slag produced can be controlled in various ways, as for example by changing the temperature at which the reaction takes place, which may be done by varying the rate of energy input or the amount of magnesia or other flux used, or both. Another method is to vary the length of time during which the slag is allowed to remain in the reaction zone. By using an excessive quantity of fluxing material it is possible to produce a slag of such low melting point that the entire charge melts down at a temperature below the reaction temperature, so that little or no reduction of silica and titanium oxid takes place. By varying the amount of flux the melting point of the slag can be varied within wide limits. It is found in practice, however, that it is desirable to have the melting point of the slag only slightly lower than the lowest desired reaction temperature, which, in producing ferro-silicon, is in the neighborhood of 1600° C. A slag of such melting point is sufficiently fluid to circulate freely at the reaction temperature and promote the carrying on of the reactions without causing such rapid melting of the charge as to render attainment of the desired temperature in the reaction zone difficult or impossible. Using a charge of the composition previously given herein, and producing a ferro-silicon-titanium alloy of the composition stated, the slag produced is of about the following analysis: alumina, 88 per cent; silica, 3 per cent; iron and titanium, less than 2 per cent; magnesia, 7 per cent.

The materials employed for the production of aluminum-copper-silicon alloy in the second step of the process are the aluminous slag produced in the first step; carbon, preferably in the form of coke; and finely divided copper, copper scale, or silicon-copper alloy. If the slag itself does not contain enough silica, a suitable amount of substantially iron-free silica-bearing material (china clay, or clean sand, for example) may be added. Or the aluminum-copper alloy produced may be enriched with silicon by adding silicon separately; or by adding an alloy containing copper and silicon, produced in any suitable manner. The amounts of the materials used with the slag depend largely upon the composition of the alloy to be produced, and will be explained more fully hereinafter. It will be sufficient here to assume that enough carbonaceous reducing agent is used to reduce substantially all the silica and alumina. The aluminum-copper alloy furnace may be like that shown in Fig. 2, and may be put into operation in the same manner.

Ordinarily most of the magnesia used as fluxing agent is lost by reduction and vaporization in step 2. If desired the vapors from this step can be treated to recover any magnesium, copper, and other valuable materials that they may contain.

The amount of aluminum that can be held by the molten copper depends largely upon the temperature,—since the higher the temperature, the higher the vapor pressure of the aluminum and hence the smaller will be the proportion of it that can be held by the copper. The absorption of aluminum by the copper is facilitated by the boiling action in the furnace, by which molten alloy is thrown up into the reaction zone where it can more readily absorb the aluminum vapors generated there by the reaction.

As previously stated, the amounts of carbon and copper needed in the second step depend, in general, upon the composition of the aluminum-copper-silicon alloy which is to be produced, as well as upon the amounts of alumina and silica or silicon provided (in the slag and from other sources) to supply the aluminum and silicon. Accordingly the carbon and copper requirements can be readily determined, with all necessary accuracy, when the alloy and slag compositions have been determined. As an example, let it be assumed that an alloy of about the following analysis is desired: aluminum, 35 per cent; copper, 55 per cent; silicon, 8 per cent; iron, less than 5 per cent; titanium, less than 1 per cent; that the slag supplied from the ferro-silicon step of the process contains, approximately, alumina, 88 per cent; silica, 3 per cent; and iron and titanium together, less than 2 per cent. In such case, with about 100 parts of the slag and 23 parts of additional sand, by weight, there will be needed, roughly, 60 parts of copper or 91 parts of copper oxid, and 46 parts of carbon. Instead of adding sand to furnish the additional silicon needed, the latter can be supplied as such, or in an alloy of copper from any convenient and suitable source. The residual anode alloy from the electrolytic refining step of the process may be used for this purpose, if desired.

The reactions which take place in the above steps are believed to be the following:

In the production of the ferro-silicon-titanium alloy—
(1) $SiO_2 + 2C = Si + 2CO$
(2) $TiO_2 + 2C = Ti + 2CO$
(3) $Fe_2O_3 + 3CO = 2Fe + 3CO_2$
(4) $Al_2O_3 + 3C = 2Al + 3CO$ In the production of the aluminum-copper-silicon alloy—
(5) $Al_2O_3 + 3C = 2Al + 3CO$
(6) $SiO_2 + 2C = Si + 2CO$
(7) $CuO + CO = Cu + CO_2$ If reaction (4) takes place it would appear that most of the aluminum so produced recombines in, or as the result of, a secondary reaction between the aluminum and the silica of the slag, since very little aluminum is ordinarily found in the ferro-silicon-titanium alloy; a result which is highly davantageous in cases where it is desired to have as little aluminum as possible in the alloy named. Of course reaction (7) takes place only when CuO is present.

In the copper-silicon-aluminum alloy the ratio of aluminum to copper should, in general, be as high as practicable, in order that a minimum amount of copper shall have to be circulated through the subsequent refining and copper-recovery operations. The amount of aluminum which can be taken up by the copper is dependent upon the temperature at the reaction zone. The minimum reduction temperature is so high (nearly 1800° C.) that the metallic aluminum has a high vapor pressure, and, of course, a still higher vapor pressure at the temperatures which must be maintained in order to carry on the reactions rapidly, that is, temperatures ranging from 1900° C. upward. For these reasons it is difficult if not impossible to produce pure aluminum by direct thermal reduction of aluminous compounds by carbon. The aluminum resulting from that reaction is in vapor form; and at temperatures low enough to condense the vapor it rapidly reacts with the carbon monoxid present to form alumina and carbon, for which reason little or no aluminum is recoverable. It is therefore desirable to have present some metal of higher boiling point with which aluminum is miscible, which will serve to condense and absorb the vaporous aluminum at the reaction temperatures. Both iron and copper serve this purpose well but of these two, copper alone is suitable for use in the subsequent electrolytic refining operation for recovery of aluminum.

As both aluminum and silicon are lighter than the slags used in the process, it is evident that alloys of these two elements with copper and iron respectively will collect at the bottom only when the respective proportions of aluminum and silicon contained are low enough so that the density of the alloy is in each case greater than the density of the slag with which it is in contact. For practical operation there should be a substantial difference between the density of the slag and the density of the alloy in order to secure effective separation of slag from alloy. In the case of ferrosilicon, reduction of the silica takes place freely at 1600° C. Its vapor pressure at temperatures well above this point is sufficiently low to permit this temperature to be exceeded considerably and still produce silicon and have it absorbed by the iron, so that the limiting factor with regard to the proportion of silicon which will appear in the alloy is not so much the temperature prevailing as it is the relative densities of the ferro-silicon and the slag at the working temperature. With a heavy aluminum slag containing about 90 per cent alumina and 8 per cent or 9 per cent magnesia, an alloy containing more than 30 per cent silicon does not freely settle out of the slag so that it can be tapped from the bottom. Consequently, ferro-silicon containing about 30 per cent of silicon is about the highest that can be made in a reaction zone in which the slag is as above described.

In the production of ferro-silicon voltages between 30 and 80 volts have been found satisfactory, but in some cases a voltage as high as 125 may be used. For handling the preferred mixture, however, we have found voltages in the neighborhood of 60 to 70 to be preferable.

When producing the aluminum-copper alloys, we have worked with voltages between 30 and 60 volts, preferably about 40.

With regard to the current used, the amount is limited by the size of the electrode and its consequent ability to carry the current without injury to itself and with good results in the reaction zone. The largest electrodes commercially made for use in furnaces of this type are 32-inch, which work very well with currents far above 20,000 amperes. With a 12-inch electrode, we use about 4,500 amperes as the maximum it will safely carry in the furnace without too rapid deterioration due to oxidation and other causes.

It has been found that the aluminum-copper-silicon alloy as tapped from the reducing furnace is not always suitable for immediate treatment in the electrolytic refining cell, by reason of the presence of non-metallic substances, such as carbon, alumina, aluminum carbid, etc., or insoluble materials, such as compounds containing titanium, which clog the bath of the refining cell. Accordingly it is advantageous and in many cases necessary, to give the alloy an intermediate cleaning treatment for removal of substances of the kind mentioned. The greater part may be removed by permitting the alloy (after withdrawal from the furnace) to cool to a temperature in the neighborhood of 1000° C. and holding it for a time at about that temperature, as for example in a reverberatory furnace. This causes some of these materials to separate out in the form of dross, which can be skimmed off and returned to the step in which the alloy is produced. Another method is to allow the alloy to solidify. In general the latter method seems to give a more nearly complete removal, but it has the disadvantage of requiring the alloy to be re-melted. In either case a large part of the objectionable substances remaining in the partially cleaned alloy can, if necessary, be removed by a sort of electrolytic treatment in the molten state with a fused bath in a cell of the type ordinarily used in the Hall process, with carbon anodes. The usual Hall cryolite-electrolyte is employed, with the alloy as cathode, and the current is passed through the cell for some time, say about two hours. The combination of the solvent effect of the bath, the reducing effect of the current, and the additional opportunity afforded for mechanical separation of entrained solid particles, results in the production of a clean alloy which may then be transferred to the electrolytic refining cell. The electrolytic cleaning or scavenging can be effected with alternating current but direct current is preferred. Any suitable voltage and current density may be used, say 6 to 10 volts, and about 800 to 1200 amperes per square foot of cross section of the bath.

In the electrolytic refining step of the present process the aluminum-copper-silicon alloy produced as described above is used as anode, in contact with a superimposed layer of electrolyte or bath, preferably consisting of fused fluorids; the pure aluminum being deposited on a cathode of molten aluminum. One important feature of this step is that the aluminum-bearing alloy which is to be refined, and which is used as anode, shall be kept in a sufficiently mobile condition, in order that the aluminum contained in it shall be free to continually replace, at the surface of the alloy, aluminum removed therefrom by the electrolysis. If aluminum is not kept continually present at the surface of the alloy, impurities in the latter may be re-dissolved and deposited at the cathode in such amount as to seriously affect the purity of the refined metal. Another feature of importance resides in promoting the secondary reactions by which impurities dissolved from the anode alloy are re-precipitated thereon and those deposited on the cathode are re-dissolved in the bath; as for example by producing an energetic circulation whereby the bath freely washes, or is freely washed by, the contiguous surfaces of the anode and cathode respectively. A further advantageous feature consists in maintaining at least a certain minimum proportion of aluminum in the anode alloy, as by withdrawing more or less of the latter and supplying fresh alloy in its place, for the purpose of preserving the selective aluminum-dissolving action of the bath.

It is also important that the fused bath or electrolyte be used under such conditions that an adequate area of contact is maintained with the anode metal below and with the cathode metal above. Otherwise the composition of the bath or electrolyte will vary, a condition which has been found to be objectionable and in some cases fatal to success.

The electrolyte or bath which we prefer in the present method contains aluminum fluorid, with the addition of one or more fluorids of metals more electropositive than aluminum. Preferably the bath is of about the following composition:

|  | Per cent. |
|---|---|
| Aluminum fluorid | 25 to 30 |
| Barium fluorid | 30 to 38 |
| Sodium fluorid | 25 to 30 |
| Alumina | 0.5 to 3 |
| Calcium and magnesium fluorids, present as unavoidable impurities, about | 2 |

The addition of fluorids of other of the alkali or alkali-earth metals is permissible. However, the presence of halogen anions other than those of fluorin is undesirable, and indeed is highly objectionable if aluminum of a high degree of purity is to be obtained. On the other hand, the presence of oxygen anions is not usually objectionable, and accordingly alumina may be an ingredient of the bath. In some cases alumina is a desirable ingredient, but not, in general, in amount sufficient to saturate the mixture. The use of a bath containing barium fluorid in amount between 20 and 60 per cent, or strontium fluorid in like amount, or a mixture of the two, is claimed broadly in our copending application Serial No. 608,285, filed December 21, 1922. Barium and strontium are alkali earth metals having atomic weights above 80.

Speaking generally, the bath or electrolyte employed should be capable, under normal conditions, of acting selectively with respect to aluminum, so that the latter can be dissolved from the anode alloy to the substantial exclusion of the other ingredients thereof. This important capability is possessed in high measure by electrolytes of the class described in the foregoing.

A bath of a composition such as given above is fluid within the range of suitable working temperatures, and is of lower density than the impure aluminum or aluminum alloy which has been found in general most desirable for the process. Hence the bath will float on the molten alloy. At the same time the bath is of higher density than the refined or pure aluminum, so that the latter will float on the former. Moreover, the bath described is capable of dissolving a substantial amount of alumina. For a more extended discussion of electrolytes suitable for the present process reference may be had to the copending application of William Hoopes and Francis C. Frary, Serial No. 608,286, filed December 21, 1922, and our copending application Serial No. 608,285, filed December 21, 1922, hereinbefore referred to.

The working temperature of the bath, in practice lies between 850° C. and 1100° C., approximately, with a preferred temperature of about 950° C. A bath of the analysis given above has at the preferred temperature mentioned a density of between about 2.5 and 2.7 grams per cc. Aluminum at the same temperature has a density of about 2.3 grams per cc., and, if it contains only small quantities of heavy metals or even considerable quantities of silicon or other impurities of low density, will float on instead of sinking in the bath. The presence of about 25 per cent of copper gives an alloy mixture which at a temperature of 950° C. has a density of about 2.8. This is sufficiently above the density of the bath to insure that the alloy will not float but will remain at the bottom. A greater proportion of copper may be used, however, provided the freezing point of the alloy does not exceed the upper limit of temperature for smooth working, which upper limit is between 1050° C. and 1100° C.

The freezing point of pure copper is around 1083° C., but the addition of 2 per cent of silicon reduces the melting point to about 1050° C., and an alloy containing 82 per cent of copper and 18 per cent of silicon has a freezing point of about 815° C. Further additions of silicon have the effect of raising the freezing point above this eutectic temperature, with the result that an alloy of 31 per cent silicon and 69 per cent copper has a freezing point of about 1050° C. Silicon is also effective in lowering the freezing point of an alloy of copper and aluminum. For example an aluminum-copper alloy corresponding in composition to the formula $Cu_3Al$ (87.6% Cu+12.4% Al) has its freezing point lowered from about 1050° C. to about 930° C. by the addition of 5 per cent of silicon, and to about 795° C. by the addition of 10 per cent of silicon. The presence of silicon in amount between 2 per cent and 32 per cent of the copper-plus-silicon therefore prevents the alloy from freezing at a temperature of 1050° C. or higher, and thus permits the removal of all or substantially all of the aluminum without causing the residual alloy to freeze at the temperature mentioned. The presence of iron and titanium, or either of them, tends to raise the freezing point, which is, of course, objectionable. Other materials than silicon will serve a like purpose of preventing the freezing of the alloy as the aluminum is removed, but silicon is preferred, and its cheapness permits it to be thrown away in the form of slag when the residual alloy is afterwards treated for recovery of the copper. On the other hand, tin or other low-melting material miscible with aluminum and copper, would have to be thrown away, or would have to be recovered in the course of reclaiming the copper. In either case the net cost of the process would be increased.

Aluminum has of itself the capability of lowering the freezing point of copper, and advantage may be taken of this fact, when necessary or desirable, by removing the alloy from the cell while it still contains some aluminum. In other words, the amount of aluminum and the amount of silicon should be so adjusted with respect to the other constituent or constituents that the anode metal will at all times remain mobile within a range of working temperatures which will not cause objectionable alteration of the bath, as by volatilization of one or another of its ingredients. Thus if it is desired to remove all of the aluminum, the silicon content when the aluminum has been removed should be not less than about 2 per cent of the copper-plus-silicon; but if the silicon content is not of itself sufficient to maintain the desired mobility, it may be necessary to remove the alloy (or replace a portion of it with fresh metal, or add silicon) before all the aluminum is extracted. Generally speaking there ought to be enough silicon to keep the alloy mobile at a temperature of 1000° C. or thereabouts when the aluminum content has been reduced to the desired extent. Silicon to the amount of 5 per cent of the copper-plus-silicon is ordinarily ample for the purpose if the iron content is not more than about 5 per cent. It is to be understood that it is not in all cases necessary to have the alloy completely molten. Under some circumstances the presence of a limited amount of solid high-freezing material entrained in the anode alloy is not objectionable so long as it does not reduce the mobility of the alloy enough to prevent its free circulation and flow.

For the above reasons, the alloy previously described as a specific product of step 2 of the present process is well adapted for electrolytic refining in step 3. This alloy has about the following composition:

|  | Per cent |
|---|---|
| Aluminum | 35 |
| Copper | 55 |
| Silicon | 8 |
| Iron, less than | 5 |
| Titanium, less than | 1 |

In the refining operation the aluminum alloy or mixture of aluminum and other substances lies in molten form at the bottom of the cell as indicated at 46. Floating on this is a layer 47 of fused bath or electrolyte, and on the latter is a layer 48 of molten aluminum, with the upper electrodes extending into it far enough to insure good electrical contact, say an inch or two. The molten layers may be established in the cell in any convenient manner, as for example by pouring the previously fused materials into place, using for the original aluminum layer the purest metal conveniently available.

Unidirectional or continuous current is led into the anode alloy or impure aluminum and passes upward therefrom through the bath or electrolyte to the cathode above, with resulting deposition of aluminum thereat. High enough current density is used to make the resistance losses within the cell sufficient to maintain the working temperature. Apparently the effect of the passage of the current is to set free fluorin or oxygen anions, or both, in contact with the surface of the anode metal. The effect of the liberation of these anions is to dissolve, from the anode alloy, aluminum and any impurity present in the alloy which is more electropositive than aluminum and to leave behind the impurities which are less electropositive. Any of the latter impurities which may be attacked by the anions tend to be immediately re-precipitated by a secondary reaction between the aluminum, with which they are in contact, and the fluorids or oxids of these less electropositive metals, with the result that only aluminum and impurities which are more electropositive pass into solution in the bath. In the anode alloy described above there are no impurities which are more electropositive than aluminum and therefore practically only aluminum goes into solution from this alloy, so long as the aluminum content remains relatively high and the aforesaid secondary reactions can occur freely.

With a bath containing sodium and barium fluorids there is also deposited at the cathode along with the aluminum, some barium and some sodium, the amounts being dependent, to some extent at least, upon the current density used and the quantitative composition of the bath. It has been found, however, that both barium and sodium react, at the working temperature, with aluminum fluorid to produce metallic aluminum and barium or sodium fluorid, as the case may be. Consequently so long as there is a sufficiently high proportion of aluminum fluorid in the bath, and the bath can freely wash the bottom of the cathode metal layer, no barium is found in the latter metal; but at the working temperature sodium, which is nearly insoluble in aluminum, is set free in gasseous form and small proportions of it escape before the secondary reaction can completely redissolve all of it. Hence minute traces of sodium are often found in the cathode metal, and some sodium escapes into the heat-insulating crust maintained above the top metal. This quantity, however, is usually very small when the bath is kept in the proper condition of fusion and is not allowed to become deficient in aluminum fluorid.

Leading electrolyzing current to the anode and from the cathode in such manner that a magnetic field is produced in the cell, is considered to be an advantageous feature. Thus in the apparatus illustrated the currents in the upper transverse horizontal busbars 41$^a$ and vertical electrodes 41, and in the lower encircling horizontal busbar 32$^a$ and tapering horizontal distributor or collector plates 32$^b$, produce in the cell a powerful and non-uniform magnetic field having both vertical and horizontal components. On account of the relatively high specific resistance of the electrolyte, as compared with that of either the anode alloy or the top metal layer, the current density throughout the horizontal cross section of the electrolyte and hence at its upper and lower surfaces, is substantially uniform. Likewise, the current density at the surface of contact between the conducting bottom lining and the anode alloy (which latter has much better conductivity than the former) is substantially uniform, although the conducting plates or ribs in the bottom lining tend somewhat to concentrate the current. But in the anode alloy the current flow may have horizontal as well as vertical components, due in part to the concentrating effect of the aforesaid plates in the bottom lining, and, probably, more especially, to the bowl-like receptacle in the bottom lining, whereby some of the current can flow between the anode alloy and the conducting side walls of the receptacle. These horizontal components of current-flow in the alloy are largely radial in direction. The interaction of the current flowing in the anode alloy and the non-uniform magnetic field produced as explained above, causes the anode alloy (which, being molten, is in effect composed of movable conductors) to flow in various directions, and produces a powerful circulation and mixing of the alloy. The stirring thus produced is, we believe, an important factor in replenishing the active surface of the anode alloy with aluminum fast enough to satisfy the anions set free thereat, making possible more extensive removal of aluminum from the alloy or the use of a higher current density, or both, without depositing impurities at the cathode in such amount as to seriously affect its quality. Moreover, the interaction of currents and magnetic field in the bath and in the cathode produces a like stirring effect in these layers which is advantageous in promoting homogeneity of composition and temperature and especially in preventing the bath from being impoverished of aluminum at the surface in contact with the cathode. The stirring effect described also insures intimate contact of the bath with the anode and cathode throughout their contiguous surfaces, thereby giving adequate opportunity for the secondary reactions by which elements (other than aluminum) deposited at the cathode are re-dissolved in the bath and by which impurities dissolved from the anode are re-precipitated thereon.

The refining operation is continued until the desired amount of aluminum has been removed from the anode and added to the cathode. A portion of the top metal is then drawn off and the impoverished anode metal is withdrawn through the tap hole 49, fresh anode metal in the molten state being supplied in any convenient way, such that the refined metal floating on the bath will not be contaminated. This operation may be conveniently performed by means of a carbon funnel, which, after being preheated, is let down until it nearly reaches the bottom of the cell, which has previously been cut out of the circuit. The refined metal entrapped in the funnel may be dipped out with a hand ladle, after which the fresh anode metal is poured in. The funnel is then lifted out. The fresh anode metal introduced is preferably sufficient in amount to raise the bath and top metal until the surface of the latter is at the same level as before the withdrawal.

The tapping out and replenishing operations may be repeated from time to time as necessary or desirable without seriously interrupting the refining process.

Notwithstanding the greater density of the bath, a portion of it is carried up by capillary action at the area of contact between the liquid aluminum and the solid boundary crust 34 and rises to the surface of the former, where it spreads in a thin layer, the weight of which is insufficient to overcome the surface tension of the liquid aluminum. Consequently it spreads over the entire surface of the latter, and by reason of the escape of heat into the air, solidifies there in the form of a crust, as indicated, for example, at 34$^a$. This process goes on until the resulting crust thickens so much that (the escape of heat being thus retarded) the temperature of its under surface can rise to the melting point of the bath. When this thickness is attained, quantities of unsaturated bath subsequently carried up by capillary action can accumulate in liquid form under the crust and finally grow to a mass of sufficient dimensions to be able to sink through the aluminum. Hence if the bath is kept unsaturated with alumina the top crust forms up to a certain thickness, after which its growth ceases. On the other hand if the freezing point of the bath is raised by allowing it to become saturated, liquid bath finding its way to the under-surface of the crust solidifies there and increases the thickness. This action would, if unchecked, result eventually in bringing up a large portion of the bath from below the aluminum and causing it to attach itself to the top crust. At the same time, the boundary crust at the sides of the cell thickens in the same manner, and the net result would ultimately be more or less complete solidification of the bath. For these reasons it is desirable to keep the bath unsaturated in the normal operation of refining.

The bath crust formed on the aluminum layer as above described serves as a convenient and good heat insulating medium to minimize loss of heat from the top of the cell, but it also entraps sodium as already explained, with consequent increase of alumina in the bath. The amount of sodium which thus escapes from the bath can be minimized by using in the latter the highest permissible amount of aluminum fluorid.

Instead of forming the heat-insulating top crust in the manner hereinbefore specifically described, such a crust may be produced by dusting over the upper surface of the aluminum layer, soon after it is put in place, a layer of finely divided alumina, carbon, magnesia, or other suitable powdered material. This layer of finely divided material is rapidly cemented together by the liquid bath coming up from below and wetting it. The heat insulating property of the top crust may be increased by dusting any suitable powdered material over it after it has been formed, so that it is covered by a layer of such material, which is an excellent insulator by reason of its porous condition. Being supplied to the surface of the top crust after the latter has solidified, the additional heat-insulating material is not cemented together and therefore retains its porosity. In general, the best material for the purpose is bath which has been allowed to solidify, since if any of it accidentally or incidentally finds its way below the top metal it does not contaminate the electrolyte.

Several methods are available for keeping the alumina content of the bath below the saturation point. For example the top metal (aluminum) can be ladled or tapped off and a portion of the saturated or nearly saturated bath dipped out, liquid or solid alumina-free or de-oxidized bath being added to take the place of that which was removed. The resulting mixture will then be well below the saturation point. Or a portion of the crust can be broken away and removed, whereupon the crust will re-form at the expense of the saturated bath within the cell, the excess alumina crystallizing out in corundum-like form. New alumina-free or de-oxidized bath can be added either in solid or liquid form to take the place of that which went to form the new crust. In the first method the saturated bath removed from the cell can be regenerated and prepared for re-entry into the process by crushing it and electrolyzing it in a separate pot for the reduction of the alumina, the de-oxidized bath thus obtained being stored for use when required.

The energy-efficiency in the electrolytic refining is dependent largely upon the perfection of the measures taken for preventing escape of heat. Theoretically almost no energy is required for the refining; but practically, in the absence of some other adequate source of heat, sufficient electrical energy must be expended to maintain the anode, the bath, and the cathode, in a fused condition, and consequently the amount of electrical energy which must be supplied is almost exactly the equivalent of the heat permitted to escape. After the heat insulation of the cell has been perfected to the maximum practicable extent, nothing further can be accomplished in limitation of the amount of heat escaping from a heated body of given dimensions, and with the minimum heat-loss the energy input required by the cell will also be a minimum. In the interests of power economy the cell should be operated at the lowest practicable voltage. Accordingly the electrolyte, which furnishes the major portion of the resistance, should be in as thin a layer as is permissible, and it has been found that a layer from 3½ to 4½ inches thick is in general satisfactory. With a bath or electrolyte of any predetermined workable depth, the current density permissible varies between a lower limit which is sufficient to maintain the anode, the bath and the cathode in a molten state, and an upper limit at which volatization of the bath is excessive or at which too large a proportion of anode impurities goes into solution. These limits, with the various bath compositions which have been found praticable, are approximately 800° C. and 1100° C., respectively, with a preferable working temperature of about 950° C. The permissible lower limit of current density also varies inversely with the dimensions of the cell, since the heat loss per unit of volume in a large cell is less than that in a small cell on account of the smaller ratio of heat-dissipating area to the volume.

In a cell having an active anode area of about 7 square feet, a current of about 8500 amperes has been found satisfactory in general. The preferred current density in a cell having the anode area mentioned is therefore about 1200 amperes per square foot. With the preferred current density mentioned, the total voltage between the terminals of the cell may be about 6 volts. Larger cells may be operated with lower current densities and at lower voltages, and by varying the size of the cell, the composition of the bath, the conductivity of the bath, and the effectiveness of the heat insulation, the electrolytic refining step can be carried out with current densities between about 800 and about 1500 amperes per square foot of active anode area. In general the lower practicable limit of voltage is about 3.5 volts and the upper limit is of course indefinite.

The layer of aluminum floating on the molten bath or electrolyte should be of sufficient expanse to touch the boundary crust of the cell around the entire perimeter thereof and should be thick enough to insure firm contact with this crust, in order to prevent or minimize volatilization of the bath, which occurs to a greater or less extent at working temperatures and increases as the temperature rises. On account of the surface tension of molten aluminum the top layer should be of substantial depth, and it is therefore desirable to maintain a thickness of at least two inches.

So long as the aluminum content of the anode alloy is not much below 10 per cent, by weight, no difficulty is ordinarily experienced in obtaining a cathode metal having a purity high enough for commercial requirements, and even higher. As the anode alloy becomes improverised small proportions of the contained impurities tend to be transferred, but by removing impoverished alloy and substituting fresh whenever the aluminum content has fallen too low the major portion of the latter metal can be obtained in very pure form.

Figure 4:
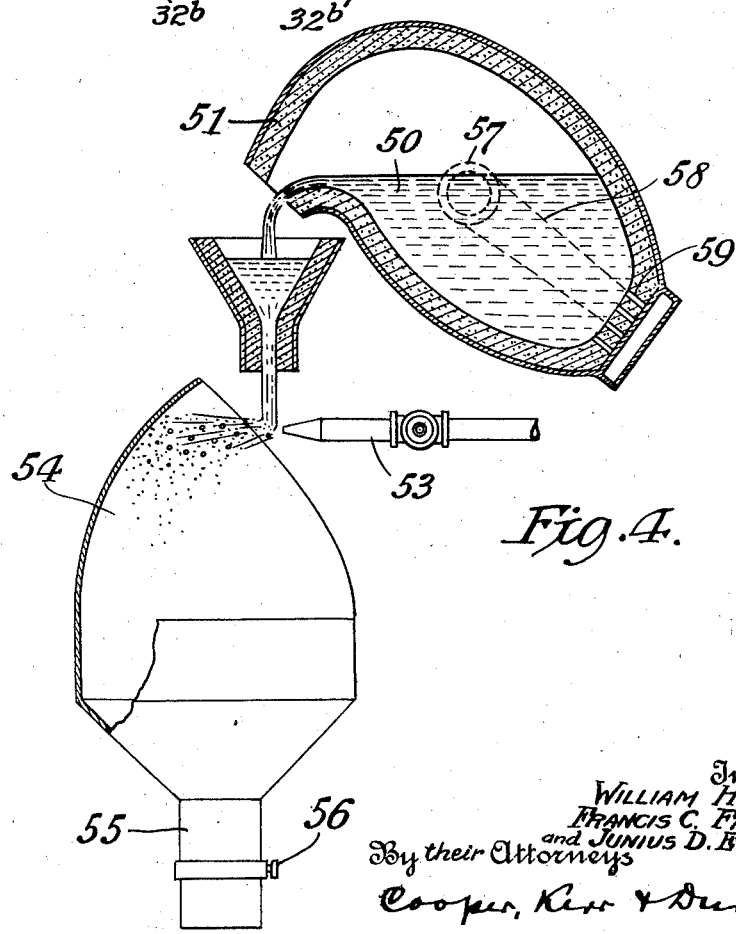
Fig. 4 is a diagrammatic sectional view illustrating an apparatus suitable for the step in which the residual copper is prepared for re-use in the process.

The residual anode alloy from the electrolytic step or steps can now be treated to put the copper in good condition for reuse in the process. If the alloy is low enough in iron and titanium so that the additional amount (of the latter metal or metals) which the alloy would receive in passing through step 2 of the process again, will not raise the iron-and-titanium content above that permissible in the electrolytic refining step, simple granulation of the alloy is usually all that is needed. For this purpose a blast of air or steam can be blown upon a stream of the molten alloy. In Fig. 4 we have illustrated the copper-recovery step in a diagrammatic manner. The molten metal 50, poured from the vessel 51, issues in a stream from the funnel 52 into the path of a blast of air or steam from the valved pipe 53 and is blown into fragments which solidify and are caught by the hopper 54, whence they can be withdrawn through the chute 55 provided with a sliding gate 56. The liquid particles produced by the blast freeze too quickly to permit much oxidation, and hence the copper thus treated may contain considerable aluminum without suffering material loss of the latter. In other words, the electrolytic refining step may leave a substantial amount of aluminum (and silicon also) in the anode copper without much if any being lost. If the residual anode copper contains too much iron and titanium, or either, more or less of the same can be removed by the well known method of oxidation and slagging or by other convenient means before the metal is subjected to the air or steam blast. The oxidation can be effected in the vessel 51 by means of air (preferably preheated) delivered through one of the trunnions 57 to the pipe 58, whence it issues through holes 59 in the bottom of the vessel or converter and bubbles up through the metal therein. Of course in this method, residual aluminum present is oxidized with the iron and titanium and is removed with the slag. Hence it is desirable to remove as much of the aluminum as possible in the electrolytic refining step, so that the slag from the copper treatment can be thrown away without entailing serious loss.

The method of electrolytic refining described herein, with the preferred electrolyte, is claimed in our copending application Serial No. 608,285, filed December 21, 1922, referred to above; and the maintaining of the bath unsaturated with alumina, and the formation and maintenance of an insulating top-crust, is claimed in the copending application of William Hoopes and Francis C. Frary, Serial No. 608,286, filed December 21, 1922, mentioned hereinbefore. The anode alloy described herein and the electrolytic treatment of the same are claimed in our copending application Serial No. 608,284, filed December 21, 1922. The electrolytic cell illustrated in Fig. 3 is claimed in the copending application of William Hoopes, Serial No. 608,287, filed December 21, 1922.

It is to be understood that the invention is not limited to details of procedure and apparatus herein specifically described but can be carried out in other ways without departure from its spirit as defined by the appending claims.

We claim—

1. A process of producing metallic aluminum, comprising treating aluminous material to remove ingredients thereof objectionable in the subsequent refining operation and leave a highly aluminous residue; smelting said aluminous residue in the presence of added material desirable in the said refining operation, to produce aluminum alloy; treating said alloy for further removal of objectionable material; and refining the treated alloy in a molten state to recover aluminum in metallic form therefrom.

2. A process of producing metallic aluminum, comprising smelting aluminous material to remove more or less of its non-aluminous impurities and produce a highly aluminous slag, smelting said slag in the presence of copper in proportions to produce an alloy suitable for electrolytic refining, treating the alloy for further removal of impurities therefrom, and recovering metallic aluminum from the treated alloy by electrolytic refining in a molten state.

3. A process of producing metallic aluminum, comprising smelting aluminous material to remove impurities tending to impair the mobility of a molten aluminum alloy, and producing thereby a highly aluminous slag, smelting said slag in the presence of a metal of higher boiling point than aluminum to produce an alloy of aluminum with such metal, treating said alloy for further removal of objectionable impurities, and by electrolytic treatment of the alloy in a molten state removing aluminum therefrom and collecting the same in metallic form.

4. A process of producing metallic aluminum, comprising treating aluminous material containing impurities under reducing conditions at a temperature below that causing rapid reduction of the aluminous content of the material, to remove impurities tending to impair the mobility of aluminum alloy in a molten state, and producing thereby a highly aluminous slag containing such impurities in lessened amount; treating said slag in the presence of copper and a reducing agent at a temperature adequate to reduce aluminous material, and producing thereby an alloy of aluminum and copper; collecting the aluminum-copper alloy and treating the same for removal of objectionable impurities, and electrolytically removing aluminum from the treated alloy in a molten form.

5. A process of producing metallic aluminum, comprising treating aluminous material to remove ingredients thereof objectionable in the subsequent refining operation and leave a highly aluminous residue, smelting said aluminous residue in the presence of material desirable in the said refining operation, to produce aluminum alloy, treating said alloy for further removal of objectionable material, refining the treated alloy in the molten state to recover aluminum in metallic form therefrom, and treating the residual alloy to recover material for re-use in the smelting step of the process.

6. A process of producing metallic aluminum, comprising smelting aluminous material to remove more or less of its non-aluminous impurities and produce a highly aluminous slag, smelting said slag in the presence of copper in proportions to produce an alloy suitable for electrolytic refining, treating the alloy for further removal of impurities therefrom, recovering metallic aluminum from the treated alloy by electrolytic refining in a molten state, and treating the residual alloy to fit the copper thereof for re-use in the process.

7. A process of producing metallic aluminum, comprising treating aluminous material to remove ingredients tending to raise the freezing point of aluminum-copper alloy, smelting the aluminous residue of said treatment in the presence of copper and added material adapted to increase the temperature range of mobility of the resulting aluminum-copper alloy, treating said alloy for removal of objectionable material, and refining the treated alloy in a molten state to recover aluminum in metallic form therefrom.

8. A process of producing metallic aluminum, comprising smelting aluminous material to reduce more or less of its non-aluminous content and produce a highly aluminous slag, smelting said aluminous slag in the presence of copper and silicon and producing an aluminum-copper-silicon alloy, treating the aluminum-copper-silicon alloy to remove therefrom material objectionable in electrolytic refining of the alloy, and refining the alloy electrolytically in a molten state to obtain metallic aluminum therefrom.

9. A process of producing metallic aluminum, comprising smelting aluminous material to reduce more or less of its non-aluminous content and produce a highly aluminous slag, smelting said aluminous slag in the presence of copper and silicon and producing an aluminum-copper-silicon alloy, treating the aluminum-copper-silicon alloy to remove the impurities therefrom, electrolyzing the aluminum-copper-silicon alloy in a molten state with a fused electrolyte to remove aluminum from the alloy and collecting the aluminum in metallic form, treating the residual alloy to recover copper therefrom, and returning the copper so recovered to the process for the production of the aluminum-copper-silicon alloy.

10. A process of producing metallic aluminum, comprising smelting aluminous material to reduce more or less of its non-aluminous content and produce a highly aluminous slag, smelting said aluminous slag in the presence of copper and silicon and producing an aluminum-copper-silicon alloy, treating the aluminum-copper-silcion alloy to remove therefrom material objectionable in electrolytic treatment, and electrolyzing the aluminum-copper-silicon alloy in a molten state with a fused electrolyte to remove aluminum from the alloy and collect the same in metallic form.

11. A process of producing metallic aluminum, comprising treating aluminous material to decrease its non-aluminous content, smelting the treated material in the presence of copper and silicon and producing an aluminum-copper-silicon alloy, treating the aluminum-copper-silicon alloy to remove therefrom material objectionable in electrolytic treatment, and electrolyzing the aluminum-copper-silicon alloy in a molten state with a fused electrolyte to obtain aluminum in metallic form from the alloy.

12. A process of producing metallic aluminum, comprising treating aluminous material to reduce separately, in the presence of different alloying metals, its non-aluminous and aluminous ingredients and produce an aluminum alloy suitable for electrolytic refining; treating said alloy to remove impurities therefrom; and electrolytically refining the treated alloy in a molten state to recover aluminum in metallic form therefrom.

13. A process of producing metallic aluminum, comprising smelting aluminous material to reduce more or less of any iron and titanium oxides contained in the material, separating the metallic and non-metallic products and treating the latter under reducing conditions in the presence of copper and silicon for the production of an aluminum-copper-silicon alloy of low iron and titanium content, treating the aluminum-copper-silicon alloy to remove non-metallic material therefrom, and electrolyzing the aluminum-copper-silicon alloy in a molten state to obtain metallic aluminum from the alloy.

14. A process of producing metallic aluminum, comprising smelting silicious-aluminous material in the presence of iron to reduce more or less of any iron, titanium and silicon oxids contained in the material and produce an iron-silicon alloy and a highly aluminous non-metallic residue or slag of low iron and titanium content, treating the slag under reducing conditions in the presence of copper and silicon for the production of an aluminum-copper-silicon alloy of low iron and titanium content, treating the aluminum-copper-silicon alloy to remove non-metallic material therefrom, and electrolyzing the aluminum-copper-silicon alloy in a molten state to obtain metallic aluminum from the alloy.

15. A process of producing metallic aluminum, comprising treating aluminous material to produce separately, in the presence of different non-aluminous metals, an alloy of low aluminum content and an alloy of high aluminum content, treating the latter alloy to remove material tending to impair the mobility of the alloy in a molten state, and electrolytically refining the treated alloy in a molten state to obtain metallic aluminum therefrom.

16. A process of producing metallic aluminum, comprising treating aluminous material to reduce separately, in the presence of iron and in the presence of copper and silicon, its non-aluminous and aluminous ingredients and produce an aluminum-copper-silicon alloy of low iron and titanium content, removing from said alloy material tending to impair its mobility in a molten state, and treating the alloy electrolytically in a molten state to recover metallic aluminum therefrom.

17. A process of producing metallic aluminum, comprising treating aluminous material to produce separately, in the presence of different non-aluminous metals, an alloy of low aluminum content and an alloy of high aluminum content, treating the latter alloy to remove objectionable material, electrolytically refining the treated alloy in a molten state to obtain metallic aluminum therefrom, and returning to the process, for the production of the second-mentioned alloy, a metal of the metallic residue of the electrolytic refining, whereby the said metal is employed cyclically as a vehicle for the aluminum.

18. A process of producing metallic aluminum, comprising treating aluminous material to reduce separately, in the presence of iron and in the presence of copper and silicon, its non-aluminous and aluminous ingredients, and produce an aluminumcopper-silicon alloy of low iron and a titanium content, removing objectionable material from said alloy, treating the alloy electrolytically in a molten state to recover metallic aluminum therefrom, and returning to the process, for use in the production of the aluminum-copper-silicon alloy, residual copper from the electrolytic refining.

19. A process of producing metallic aluminum, comprising smelting in the presence of copper, aluminous material low in iron and titanium, treating the resulting alloy to remove objectionable material, and thereafter electrolyzing the treated alloy in a molten state at a temperature below the freezing point of copper to recover metallic aluminum therefrom.

20. A process of producing metallic aluminum, comprising smelting in the presence of copper, aluminous material low in iron and titanium and adding thereto material effective to lower the freezing point of aluminum-copper alloy, collecting the resulting alloy, treating the same to remove non-metallic impurities, and electrolytically refining the alloy in a molten state to obtain metallic aluminum therefrom.

21. A process of producing metallic aluminum, comprising smelting in the presence of copper aluminous material low in iron and titanium, supplying silicon in amount adequate to produce an aluminum-copper-silicon alloy mobile at the working temperature of a fluorid bath containing aluminum fluorid, treating the aluminum-copper-silicon alloy to remove material tending to impair the mobility of said bath, and electrolytically impoverishing the treated alloy of its aluminum content in a molten state in said fluorid bath.

22. A process of producing metallic aluminum, comprising smelting aluminous material low in iron and titanium in the presence of copper, blending silicon with the resulting product to produce an aluminum-copper-silicon alloy mobile below the temperature of material volatilization of aluminum fluorid from a molten bath, treating the alloy to remove material tending to impair its mobility, and electrolytically recovering metallic aluminum from said alloy in a molten state beneath a fluorid bath containing aluminum fluorid.

23. A process of producing metallic aluminum, comprising reducing alumina with carbon in the presence of copper and another element miscible with copper to form an aluminum alloy adequately mobile at a temperature below the melting point of copper, treating the alloy to remove objectionable material, and recovering aluminum from said alloy in the molten state.

24. In a process of producing refined aluminum, smelting aluminous material low in iron and titanium in the presence of copper to produce an aluminum-copper alloy low in iron and titanium and compounded to be mobile at the temperature of a fused electrolyte, and treating the alloy electrolytically in contact with such electrolyte to recover metallic aluminum from the alloy.

25. In a process of producing refined aluminum from impure material, the steps comprising electrothermally producing with such material an aluminum-copper alloy suitable for electrolytic separation, treating the alloy to render it substantially free from entrained solid matter, and electrolytically removing and collecting aluminum from the alloy in a molten state.

26. In a process of producing refined aluminum from impure material, the steps comprising producing with such material an aluminum-copper alloy suitable for electrolytic separation, treating the alloy electrolytically as cathode with a fluorid electrolyte to remove objectionable materials, and electrolytically removing and collecting aluminum from the alloy in a molten state.

27. In a process of producing refined aluminum from impure material, the steps comprising producing with such material an aluminum-copper alloy suitable for electrolytic separation, treating the alloy mechanically to remove entrained solid matter and treating it electrolytically to render it substantially free from objectionable material, and electrolytically removing and collecting aluminum from the alloy in a molten state.

28. In a process of producing refined aluminum from impure material, the steps comprising producing with such material an aluminum-copper alloy suitable for electrolytic separation, treating the alloy in a molten state with molten salts to remove objectionable impurities, and treating the alloy electrolytically in a molten state to recover aluminum therefrom.

29. In a process of producing refined aluminum from impure material, the steps comprising producing with such material an aluminum-copper alloy adapted for electrolytic separation in a fused bath, treating the alloy in a molten state with molten fluorids to remove material tending to impair the mobility of the bath at the temperature of such bath, and treating the alloy electrolytically in said fused bath to recover aluminum therefrom.

30. In a process of producing metallic aluminum from impure material, producing with such material an aluminum-copper alloy of low iron and titanium content but containing silicon in substantial amount, treating the alloy to remove entrained solid material, and electrolyzing such alloy in a molten state with a fused electrolyte to remove aluminum from the alloy.

31. In a process of producing metallic aluminum from impure material, producing impure aluminum and silicon from the material by electrothermal reduction of the aluminous and silicious constitutents thereof and such additional silicious material as may be needed, and with the addition of copper producing an aluminum-copper alloy of low iron and titanium content but containing silicon in substantial amount; treating the alloy to remove entrained solid material; and electrolyzing the said alloy in a molten state with a fused electrolyte to remove aluminum from the alloy.

32. In a process of producing metallic aluminum from impure material, treating the material electrothermally with suitable substances to remove silicon, iron and titanium, and produce a highly aluminous slag low in iron and titanium; utilizing the slag for the electrothermal production of aluminum-copper-silicon alloy of low iron and titanium content; treating the alloy to remove entrained solid material; and electrolyzing the said alloy in a molten state with a fused electrolyte to remove aluminum from the alloy.

33. In a process for producing metallic aluminum from impure material, treating the material electrothermally with suitable substances to remove silicon, iron and titanium, and produce a highly aluminous slag of low iron and titanium content; treating the slag electrothermally and with the addition of silicon in suitable form producing aluminum-copper-silicon alloy low in iron and titanium; treating the alloy to remove entrained solid material; and electrolyzing the said alloy in a molten state to remove aluminum therefrom.

34. In a process of producing metallic aluminum from impure material, treating electrothermally with suitable substances aluminous material containing silica, and iron and titanium oxid, and producing an alloy containing silicon, iron, and titanium, and a copper allow containing silicon and a substantial portion of the aluminum of the original material; treating the alloy to remove entrained solid material; electrolytically removing aluminum from the alloy; and treating the alloy, after the removal of aluminum, to recover copper therefrom.

35. In a process for producing metallic aluminum from impure material containing alumina, smelting the material in the presence of iron to produce an iron alloy containing a substantial amount of any iron and titanium present in said material and leave a nonmetallic residue or slag of low iron and titanium content, but containing a substantial amount of the alumina, treating the said residue to produce aluminum-copper-silicon alloy of low iron and titanium content, treating the alloy to remove entrained solid material, and electrolytically removing aluminum from a lower molten body of said alloy as anode and depositing the aluminum so removed on an upper body of molten aluminum as cathode through an intermediate layer of fused electrolyte.

36. In a process of producing metallic aluminum from impure material containing alumina, smelting the material in the presence of iron to produce an iron alloy containing a substantial amount of any iron and titanium present in said material, and leave a nonmetallic residue or slag of low iron and titanium content but containing a substantial amount of the alumina, treating the said residue to produce aluminum-copper-silicon alloy of low iron and titanium content, treating the alloy to remove entrained solid material, electrolytically removing aluminum from a lower molten body of said alloy as anode and depositing the aluminum so removed on an upper body of molten aluminum as cathode through an intermediate layer of fused electrolyte, and returning to the process copper from the residual alloy, for the production of the aluminum-copper-silicon alloy.

37. In a process of producing metallic aluminum from impure material containing alumina and silica, smelting the material electrothermally with a substance adapted to take up a substantial amount of any iron and titanium contained in said material, to produce a nonmetallic mixture low in iron and titanium and containing a substantial amount of the alumina, treating the said mixture electrothermally with a reducing agent in the presence of copper and silica to produce aluminum-copper-silicon alloy of low iron and titanium content, treating the alloy to remove entrained solid material, electrolytically removing aluminum from a lower molten body of said alloy as anode and depositing the aluminum so removed on an upper body of molten aluminum as cathode, through an intermediate body of fused electrolyte, and returning the copper of the impoverished anode alloy to the process, for the production of the aluminum-copper-silicon alloy.

38. In a process of producing metallic aluminum from impure material containing alumina and silica, smelting the material electrothermally in the presence of iron to produce a silicon-iron alloy and a nonmetallic residue or slag of low iron and titanium content and containing a substantial amount of the alumina; treating the said residue electrothermally with a reducing agent in the presence of copper and silica to produce aluminum-copper-silicon alloy of low iron and titanium content, treating the alloy to remove entrained solid material, electrolytically removing aluminum from a lower molten body of said alloy as anode and depositing the aluminum so removed on an upper body of molten aluminum as cathode through an intermediate body of fused electrolyte, and returning copper from the residual alloy to the process, for the production of the aluminum-copper-silicon alloy.

39. In a process of producing metallic aluminum from aluminous materials containing impurities, electrothermally treating said material in the presence of a reducing agent and a heavy metal to reduce and precipitate undesired portions of said impurities and produce a non-metallic slag rich in alumina, reducing said slag electrothermally in the presence of a metal of higher boiling point and greater density free from impurities objectionable in electrolytic refining, recovering the resulting aluminum alloy, impoverishing said alloy by electrolytic abstraction of aluminum, recovering said metal of higher boiling point and greater density from said impoverished alloy and returning said recovered metal for re-use in said process.

40. In a process of producing metallic aluminum from impure material, the steps comprising producing from such material an aluminum-copper alloy of low iron and titanium content, and treating said alloy to remove nonmetallic impurities therefrom.

41. In a process of producing metallic aluminum from impure material, the steps comprising producing impure aluminum and silicon from the material by electrothermal reduction of the aluminous and silicious constituents thereof and such additional silicious material as may be needed, and with the addition of copper producing an aluminum-copper alloy of low iron and titanium content but containing silicon in substantial amount; and treating said alloy to remove entrained solid material.

42. In a process of producing metallic aluminum from impure material, the steps comprising treating the material electrothermally with suitable substances to remove silicon, iron, and titanium, and produce a highly aluminous slag low in iron and titanium; utilizing the slag for the electrothermal production of aluminum-copper-silicon alloy of low iron and titanium content; and treating the alloy to remove entrained solid material.

43. In a process for producing metallic aluminum from impure materials, the steps comprising treating the material electrothermally with suitable substances to produce aluminum-copper alloy, and treating the alloy to remove entrained solid material.

44. In a process for producing metallic aluminum from impure materials, the steps comprising treating aluminous material electrothermally to separate iron and titanium therefrom, and after such separation treating the material electrothermally with copper to produce aluminum-copper alloy low in iron and titanium.

45. In a process for producing metallic aluminum from impure materials, the step comprising producing by electrothermal treatment of such material an aluminum-copper alloy low in iron and titanium.

46. In a process for producing metallic aluminum from impure materials, the step comprising producing from such material an aluminum-copper alloy low in iron and titanium.

In testimony whereof we hereto affix our signatures.

WILLIAM HOOPES.
FRANCIS C. FRARY.
JUNIUS D. EDWARDS.